Aug. 18, 1925.

W. TIMSON 1,550,125

INDICATING MECHANISM FOR PENDULOUS WEIGHING SCALES

Filed March 3, 1923

INVENTOR.
WILLIAM TIMSON
BY George E. Folk
ATTORNEY.

Aug. 18, 1925.  
W. TIMSON  
1,550,125  
INDICATING MECHANISM FOR PENDULOUS WEIGHING SCALES  
Filed March 3, 1923  2 Sheets-Sheet 2

INVENTOR  
William Timson  
By George E. Folks  
ATTORNEY.

Patented Aug. 18, 1925.

1,550,125

UNITED STATES PATENT OFFICE.

WILLIAM TIMSON, OF BIRMINGHAM, ENGLAND, ASSIGNOR TO W. & T. AVERY, LIMITED, OF BIRMINGHAM, ENGLAND.

INDICATING MECHANISM FOR PENDULOUS WEIGHING SCALES.

Application filed March 3, 1923. Serial No. 622,650.

*To all whom it may concern:*

Be it known that WILLIAM TIMSON, a subject of the King of Great Britain, residing at Soho Foundry, Birmingham, England, has invented a new and useful Improvement in Indicating Mechanism for Pendulous Weighing Scales, and he does hereby declare the following to be a full, clear, and exact description of the same.

This invention has reference to improvements in indicating mechanism for pendulous weighing scales, and has for its object to effect a simplified and novel construction of mechanism which can be readily adapted to weighing mechanism of different types and which shall be very sensitive and accurate.

The invention consists of an indicating mechanism for pendulous weighing scales characterized by the rotatable weight indicator being provided with a floating mounting which has connexion to the pendulous resistant in such a manner that any movement of the pendulous resistant only imparts an axial motion to the floating mounting, and in the combination therewith of means for checking any swinging or oscillatory motion of the indicator mounting.

The invention will now be described with particular reference to the accompanying drawings wherein similar reference numerals indicate similar parts in the different views.

Figure 1:
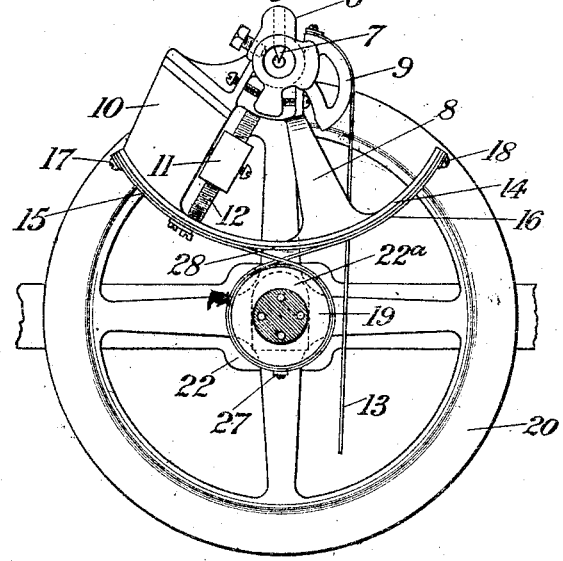
Fig. 1 is a part sectional front elevation of the weight indicating mechanism comprising the present invention.
Figure 2:
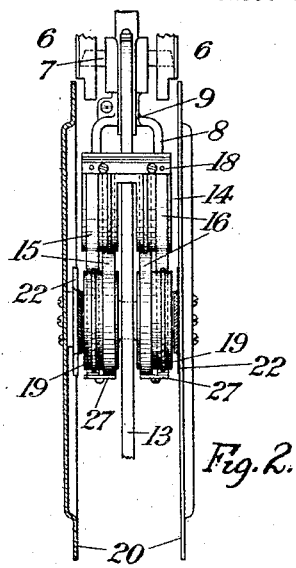
Fig. 2 is a part sectional side elevation of the mechanism seen in Fig. 1.
Figure 3:
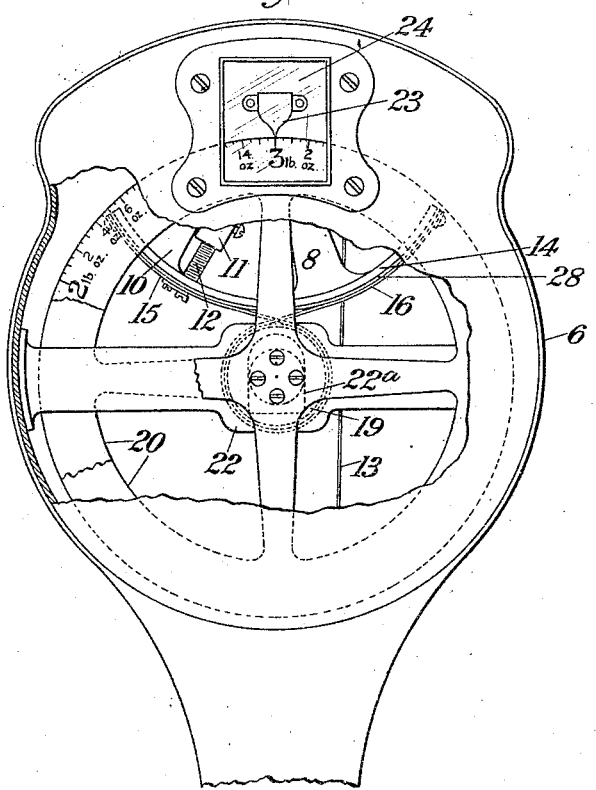
Fig. 3 is a front elevation showing the mechanism seen in Fig. 1 in the position it occupies within the head of a scale housing, the weight indication being obtained by means of a rotatable dial which registers with a fixed pointer.

Referring first more particularly to the construction illustrated by Figs. 1, 2 and 3 of the drawings, we provide a housing or framework 6 within which is mounted by means of a knife-edge 7 a pendulous lever or sector 8 one part of which is formed as a cam sector 9 and the other part formed as a pendulous weight 10 provided with an auxiliary adjustable weight 11 which is mounted upon the screw 12. The cam sector 9 is connected by means of a flexible metallic ribbon 13 to the scale pan or lever mechanism of the scale (not shown) and any load applied to the scale pan is transmitted through the said ribbon 13 to the pendulous weights or resistant 10 and 11. Formed integral with the lever 8 is a pendulous segment 14 located below and equally on each side of the knife-edge 7. The periphery of the segment 14 is provided with two pairs of flexible metallic ribbons 15 and 16 respectively which are connected at their outer ends by means of the clamping plate and screws 17 and 18 respectively to the ends of the segment 14, and these pairs of ribbons 15 and 16 are oppositely wound around and connected by means of the clamping plates and screws 27 to the drum or spindle 19 which forms the rotatable mounting of the weight indicator. These pairs of ribbons 15 and 16 form the complete support for the drum or spindle 19, that is, the drum or spindle 19 has no lateral or end bearing or support in the housing or frame 6 of the scale, and thereby is constituted a floating mounting for the weight indicator.

Figure 4:
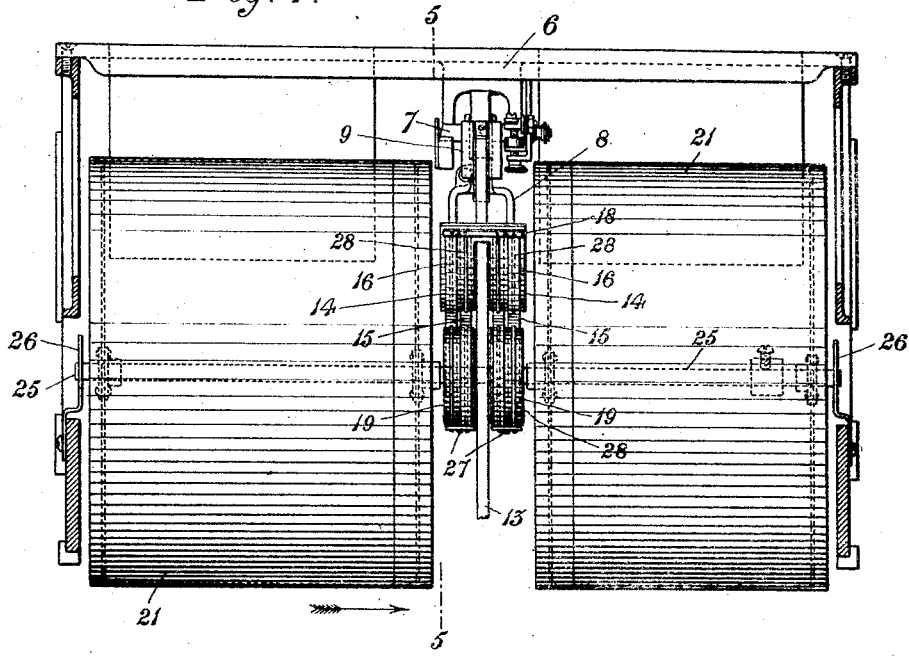
Fig. 4 is a part sectional front elevation showing the indicating mechanism seen in Figs. 1 and 2 applied to a drum or cylinder price computing and weighing scale the mechanism being at the half load capacity position.
Figure 5:
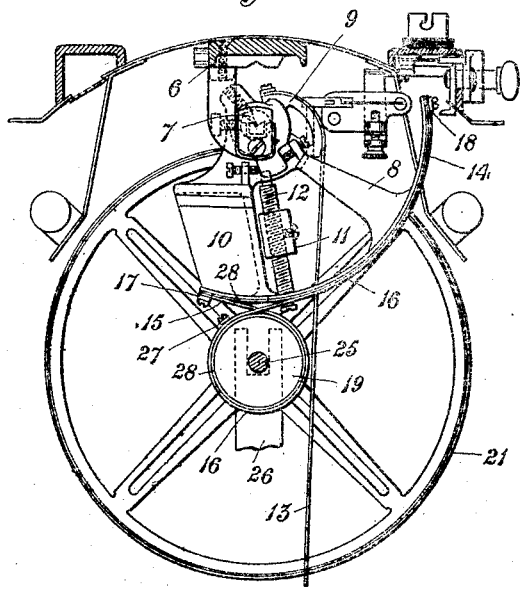
Fig. 5 is a part sectional end elevation on line 5—5 of Fig. 4, but showing the mechanism at the zero position.

The weight indicator may take various forms, for example, in Figs. 1, 2 and 3 it is shown as a pair of rotatable dials 20; whereas in Figs. 4 and 5 it is shown as a pair of rotatable drums 21.

For the purpose of checking any swinging or undue oscillation of the indicator mounting 19 we provide a pair of arms 22 provided with slots 22ª therein, the said arms being secured to the housing or framing 6 of the scale. The slots 22ª embrace reduced portions of the drum or spindle 19 but do not contact therewith when the parts are in their balanced or weighing position. The purpose of these slotted arms being to check any tendency to a swinging motion of the drum or spindle 19 when weight is applied to or removed from the scale pan or the platform. It will be seen that in the event of any oscillation of the drum or spindle 19 that it will contact with one side of the slots 22ª and that this contact will prevent any excessive oscillatory motion of the floating indicator mounting.

In addition any known form of vibration checking or motion damping mechanism may be fitted to the scale mechanism so as to prevent any excessive motion or shock being imparted to the indicating mechanism of the scale; this mechanism is generally termed a dashpot and is applied to the lever mechanism of the scale and is not shown in the drawings.

In the mechanism hereinbefore described the resistance to any load applied to the scale consists of the pendulous weights 10 and 11 and any part of the pendulous lever or segment which is unbalanced, but it will be obvious that the adjustable pendulous weight 11 can be dispensed with, and the one-piece pendulous lever or segment form the total weighing resistance of the scale.

The rotatable dials 20 are adapted to register with and indicate against fixed pointers 23 which are secured to the housing or framing of the scale or to brackets secured thereto, and the pointer together with a section of the rotatable dial 20 is visible through a window or aperture 24 provided in the front and rear faces of the upper section of the scale housing.

Referring now more particularly to Figs. 4 and 5 which illustrate the application of the invention to a price computing and weighing scale of the cylinder type, the cylinder 21 is divided into two parts mounted on the one spindle 25 the spindle 25 forming part of and being secured to the rotatable floating mounting 19. The outer ends of the spindle 25 are disposed within the slotted ends of the pair of forked brackets 26 secured to the housing or framework 6, and these forked brackets serve the same purpose as the slotted arms 22 in the construction hereinbefore referred to.

In all other material respects the construction of the weight indicating mechanism and mounting are similar to that already described with reference to Figs. 1, 2 and 3 of the drawing, and it is not proposed to reiterate this description as the similarly enumerated parts in all the figures correspond.

Preferably the periphery of the segment 14 and the periphery of the drum or spindle 19 to which the pairs of flexible metallic ribbons 17 and 18 are connected and on which they have their bearing are formed with raised ribs 28 having say a convex cross section. The said ribbons are mounted on the said ribs in such a manner that there is substantially only a lineal contact between the ribbon and the surface of the rib along the longitudinal centre-line of the ribbon. By this means the ribbon can effect a self-adjustment in the event of any torsional or similar displacement or movement being transmitted to the ribbon, and by this means any inaccuracy which might result is avoided. By means of these ribs the peripheral surface contact is reduced to a minimum and therefore a far greater degree of accuracy is achieved in the indication of the weight than is possible with existing forms of transmission.

By dispensing with the ordinary end bearings for the drum or spindle of the weight indicator and floating the same below the pendulous segment, and in mounting the whole of the indicating mechanism upon one knife edge, a very sensitive and accurate mechanism is obtained in comparison with known forms of weight indicating mechanism which employ a flexible ribbon connexion between the scale plate or lever mechanism and the weight indicating mechanism, the ribbon having connexion to a pendulous segment or drum which is usually displaced in a horizontal or vertical direction under the action of the load transmitted through the flexible ribbon.

Those parts of the mechanism shown in the drawings and not specifically referred to in this specification form no part of the present invention. This invention is not limited to any particular construction of mechanism, nor to any particular type of scale as it is capable of many variations and adaptations.

Claims:—

1. An indicating mechanism for weighing scales comprising a pendulous resistant, a rotatable weight indicator, means for freely suspending the said indicator from the pendulous resistant whereby motion of the said resistant imparts a rotary motion about its axis to the said indicator, and the combination therewith of the axis of means for checking any oscillatory motion of the indicator.

2. An indicator mechanism for weighing scales, a pendulous resistant, a weight indicator, oppositely wound flexible ribbons connected to the said resistant and constituting the floating mounting for the weight indicator, and means for checking any oscillatory motion of the axis of the indicator.

3. In pendulous automatic weight indicating mechanism, comprising in combination a pendulous segment, a mounting for the indicator rotatable about its axis, oppositely wound flexible ribbons connecting said segment and mounting and forming the complete support of the said mounting, raised ribs on the periphery of the segment and on the periphery of the rotatable mounting to constitute a substantially linear mounting for the said ribbons.

4. An indicating mechanism for weighing scales comprising in combination a pendulous resistant connected to the load receiving scale plate, a rotatable mounting for the weight indicator, flexible ribbons forming the connexion and support between the said pendulous resistant and the rotatable mounting, means for checking oscillatory motion of the said mounting, and a weight indicating device connected to the said mounting.

5. An indicating mechanism for weighing scales comprising in combination a pendulous segment mounted by means of a knife-edge and adapted for circumferential reciprocal motion, a flexible connexion from said segment to the goods receiving pan of the scale or to a lever connected therewith, a rotatable mounting, oppositely wound flexible ribbons connected to the said segment and to the said mounting forming the support and means for imparting rotation in either direction to the said mounting, means for checking the lateral motion of the said mounting, weight indicating dials secured to said mounting and rotatable therewith, and pointers secured to the scale housing adapted to indicate against the weight graduations on the said dials.

6. An indicating mechanism for weighing scales comprising in combination a pendulous segment mounted by means of a knife-edge and adapted for circumferential reciprocal motion, a flexible connexion from said segment to the goods receiving pan of the scale or to a lever connected therewith, a rotatable mounting, oppositely wound flexible ribbons connected to the said segment and to the said mounting forming the support and means for imparting rotation in either direction to the said mounting, means for checking the lateral motion of the said mounting, weight indicating drums secured to the said mounting and rotatable therewith, and a fixed indicator adapted to indicate against graduations on the said drums.

In testimony whereof, I have signed my name to this specification.

WILLIAM TIMSON.